United States Patent Office 3,322,531
Patented May 30, 1967

3,322,531
PRODUCTION OF CESIUM
Frederick Tepper, Butler, Pa., assignor to Mine Safety Appliances Company, a corporation of Pennsylvania
No Drawing. Filed Sept. 8, 1960, Ser. No. 54,571
1 Claim. (Cl. 75—66)

This invention relates to a new method for producing rubidium and cesiums, and more particularly to their production directly from minerals containing rubidium and/or cesium.

Heretofore rubidium and cesium have generally been prepared from pure rubidium or cesium salts, such as rubidium chloride or cesium chloride. These methods are prohibitively expensive primarily because the preparation of the salts is expensive and tedious since rubidium and cesium compounds, although they are found widely scattered throughout the world, are found only in small amounts, usually associated with other alkali metal minerals.

The only known important cesium mineral is pollucite, a complex cesium aluminum silicate having the approximate formula $Cs_4Al_4Si_9O_{26} \cdot H_2O$, which contains a comparatively high proportion of cesium, i.e. up to about 35% $Cs_2O$. No true rubidium mineral has yet been discovered, although other alkali metal minerals may contain up to the equivalent of about 5% rubidium oxide. Almost invariably a mineral containing a substantial amount of cesium also contains a minor amount of rubidium, and minerals containing a substantial amount of rubidium also contain a minor amount of cesium.

It is an object of this invention to provide a simple, direct economical method of recovering rubidium and cesium from complex oxide minerals containing rubidium and/or cesium. Another object is to provide a method of directly producing alloys of rubidium and cesium with other alkali metals.

Another object is to provide a method of directly recovering cesium from pollucite. A still further object is to provide a method of directly recovering rubidium from lepidolite or biotite minerals which contain significant amounts of combined rubidium.

Other objects will be apparent from the following description and claim.

This invention is based on my discovery that rubidium and cesium are displaced from complex oxide minerals containing them by heating and reacting the mineral with sodium, potassium or mixtures thereof; and that the produced cesium and rubidium are readily recoverable, either together or separately from the reaction mixture.

In the practice of this invention sodium and/or potassium and the mineral containing rubidium and/or cesium are mixed together and heated to, or otherwise contacted at, an elevated temperature at which sodium and potassium react to displace rubidium and cesium from the mineral; the produced rubidium and cesium are separated from the reaction mixture by distillation, filtration, or similar fluid solid separations. Generally, the rubidium and cesium are recovered alloys with excess reactant sodium or potassium. These alloys are in themselves useful for many purposes; for example, many of them have unusually low freezing temperatures and are therefore particularly useful in low temperature heat transfer applications. Rubidium and cesium can be separated, if desired, from the alloying alkali metals by distillation, partial freezing, oxide slagging or combinations of these and other methods as is hereinafter described in detail.

Suitable complex oxide minerals for use in this invention include silicate, aluminum silicate, and phosphate minerals or ores which contain some rubidium or cesium. Especially suitable for the preparation of rubidium are varieties of mica, such as lepidolite or biotite which may contain from a few tenths to several percent rubidium. Pollucite is especially suitable for the production of cesium; pollucite ore generally contains some other silicates and has a $Cs_2O$ content of 25–28%, and these ores are included within the meaning of the term pollucite as used herein.

The method of this invention is especially economical because the complex oxide minerals can be used as mined with no pretreatment or processing. The minerals, either dehydrated or containing the natural water of hydration, are disintegrated by sodium or potassium at reaction conditions so that it is not necessary to finely divide the mineral to accomplish reaction, and any convenient lump or particle size may be used, including large lumps of mineral as mined. Somewhat more rapid reaction is obtained when finely divided mineral is used, e.g. less than 100 mesh but it is preferred to use minerals in lump form, e.g. ⅜ inch or larger, because after reaction the reduced mineral is in the form of a filterable slurry in the alkali metals. I have also found that water of hydration does not interfere with the reaction to produce rubidium and cesium. Two moles of sodium or potassium are consumed by reaction with each mole of water present in the mineral to produce sodium or potassium oxide and hydrogen, so the yield of rubidium and cesium per pound of sodium or potassium consumed can be increased by dehydrating the ore prior to reaction. If desired, water of hydration is readily removed by heating the ore at atmospheric or subatmospheric pressure; for example, water of hydration is readily removed from pollucite at 1000° F. and atmospheric pressure.

The reaction must be performed in the absence of air or other gases reactive with alkali metals; this may be accomplished by carrying out the reaction under vacuum, or preferably under an inert gas atmosphere, such as a nitrogen or argon atmospheres. Alloys of rubidium and cesium with other alkali metals which may be recovered directly from the reaction mixture are pyrophoric in air, even at room temperature, and must be protected by vacuum or inert gas cover.

Any proportion of reactants may be used, but in general, it is preferred to use a substantial excess of reactant sodium or potassium, e.g. 200 or 300% of that required by the reaction; any larger amount may be used without detriment. The excess reactant promotes the reaction rate, permits substantially complete recovery of the rubidium and cesium, facilitates contact of the reactants, and provides a fluid carrier for easy removal of the reduced rubidium and cesium minerals. The amount of reactant sodium and potassium consumed in the reaction depends, of course, on the mineral used, and is readily ascertainable. Generally, 1 mole of sodium or potassium is required for each mole of contained rubidium and cesium. In addition, sodium will at least partially free potassium from minerals containing it. I have also found that about 3 to 4 moles of reactant alkali metal are consumed for each mole of other alkali metal produced when aluminum silicate minerals are used. The increased consumption appears to be due to secondary reactions of the alkali metals with the alkali metal aluminum silicates. Illustrative of the preferred reactant proportions, I have found that the desired excess is obtained if about 5 to 10 moles of reactant alkali metal is used for each mole of cesium contained in pollucite; about 1 part by weight reactant alkali metal is used for each 2 parts of an alkali metal mineral containing small amounts of rubidium and cesium, e.g. lepidolite, which generally contains up to 5% rubidium.

Sodium, potassium, or mixtures thereof may be used as the reactant alkali metal, and excess reactant alkali metal can be recovered and reused for further reaction with additional mineral. Generally it is preferred to use sodium because of its lower cost. When minerals containing potassium are used as a rubidium or cesium source it is convenient and economical to recycle sodium-potassium alloy, formed from excess sodium and the reaction produced potassium for reuse.

The reaction to liberate rubidium and cesium from complex oxide minerals proceeds readily at about 900° F. or any higher temperature desired, e.g. 1600° F., and it is generally preferred to use a temperature between about 1000° F. and 1300° F. The rate of reaction increases with increasing temperature, so that a higher production rate is realized at temperatures substantially above 900° F. At temperatures below about 1300° F., the reduced ore is readily removed as a finely divided solid when large excesses of sodium or potassium are used; when smaller amounts of sodium or potassium are used, or when the mineral is charged as a finely divided power, the reduced mineral is in the form of an easily frangible sintered cake. However, if higher temperatures are used, the reaction mixture goes through a totally fused state apparently due to the formation of comparatively low melting eutectic mixtures of complex oxide reaction products. These fused mixtures are extremely viscous and difficult to remove from the reactor in a fused state, and when cooled form a solid rock-like residue. At least higher temperature I have found it convenient to use a removable disposable reactor liner to hold the reaction mixture.

The following examples are illustrative of the reactions of this invention to liberate rubidium and cesium 50 g. of ⅜ inch to ½ inch lump pollucite containing about 25% $Cs_2O$ and 50 g. of sodium were charged to a stainless steel reactor under a nitrogen atmosphere. The amount of sodium used was sufficient when melted to completely immerse the pollucite. The reactor was equipped with an exhaust vent to permit argon flushing and venting of the expanded cover gas during heating. The reactor was heated to 1200° F. for four hours and then cooled to room temperature. The reduced ore was disintegrated to particles having an average size of less than 40 mesh, and was readily filterable from the produced fluid cesium-sodium alloy. An 83.5% yield of cesium, recovered as alloy, was obtained.

In another reaction, a stainless steel tube 1½" in diameter and 12" long was used as a reactor and distillation column, and opened overhead to a condenser for produced liquid metals. A charge of 50 g. of −200 mesh pollucite containing about 25% $Cs_2O$ and 55 g. of sodium was charged to the reactor, and a 6" depth of ¼" stainless steel raschig rings was supported in the tube above the charge. The reactor was heated to about 1500° F. for about one hour and the alkali metal product, distilled through the short column, was condensed, periodically sampled, and analyzed. Over 80% of the cesium in the charge was freed and recovered in the distillate alloy; the cesium content of the produced alloy was initially about 85% and decreased during the reaction to about 70%, the remainder of the alloy being sodium and a very small amount of rubidium which was freed from the ore along with the cesium. The produced alloy composition is, of course, dependent on the amount of separation accomplished by the distillation.

In another example 50 g. of −60 mesh pollucite and 50 g. of sodium were charged to a closed-end stainless steel tube reactor and heated to 1500° F. for ½ hour. With the closed reactor, none of the alkali metals were removed from the reaction mixture during the reaction. The reactor was then cooled to room temperature, and the fluid alloy of cesium and excess sodium was filtered from the solid residue under an inert atmosphere, giving a cesium yield of over 95%. A similar yield of cesium was obtained in the same manner using a temperature of 1000° F. and a reaction time of two hours.

In still another example, 100 g. of lepidolite and 50 g. of sodium was charged under an argon atmosphere to the stainless steel combination reactor and distillation column referred to above. The charged reactor was heated to about 1300° F. for 2 hours and the temperature was then increased to distill the alkali metals from the reactor. Substantially all the rubidium was recovered in the distillate alloy which had the composition 43.5% Na, 35.6% K, 16.5% Rb, and 2.4% Cs. The lepidolite used had the composition $Li_2O$, 3.75%; $K_2O$, 7.84%; F, 5.5%; $Al_2O_3$, 29.06%; $SiO_2$ 55.88%; $Rb_2O$, 3.28%; $Cs_2O_2$, trace; and the remainder heavy metal oxides.

Sodium and potassium are readily separated from alloys with the produced cesium and rubidium by distillation at atmospheric or subatmospheric pressures. The distillation may be done concurrently with the reaction, as a still pot and passing the metal vapors through distillation column; the produced cesium and rubidium potassium are returned to the reactor. Or the alloys produced by reaction may be recovered and subsequently distilled separate sodium and potassium. The distillative separation of sodium and potassium from cesium and rubidium is readily accomplished by conventional methods inasmuch as the vapor pressures of cesium and rubidium are much higher than that of sodium and potassium. Rubidium and cesium may also be separated from each other by distillation, or separately recovered from their alloys with other alkali metals by fractional distillation, as is disclosed in my co-pending application Ser. No. 54,572, filed on even date herewith, now abandoned.

Cesium produced from pollucite and separated as a single volatile fraction from sodium or potassium contains from about 2 to 5% rubidium, depending on the rubidium content of the pollucite used. I have found that the rubidium can be simply and effectively removed by oxide slagging, that is, by the reaction of the alloy with a controlled amount of oxygen. One fourth mole of oxygen ($O_2$) is required for each mole of rubidium present for substantially complete removal of the rubidium, and if oxygen in excess of this amount is used, a corresponding loss of cesium will result. Thus, for example, cesium containing 4.5% rubidium was melted and contacted with oxygen in the amount of 1 mole of oxygen for each 4 moles of rubidium. The cesium was then distilled from the solid oxide produced and over 99% of the cesium was recovered having a purity of 99.1%. Similar purities and recoveries are realized by filtering the solid oxide from the purified cesium.

Even higher purity cesium may be produced using multiple step slagging; a portion of the required oxygen is reacted, the produced oxides are separated by distillation or filtartion, and the cycle is repeated until a total of ¼ mole of oxygen ($O_2$) for each mole of rubidium is used in all the cycles. For example, when ½ of the desired amount of oxygen was used in each of two slagging cycles, 99.5% cesium was recovered with substantially no processing loss.

Ores containing substantial amounts of rubidium generally contain a much smaller amount of cesium. The minor amount of cesium in rubidium separated from sodium or potassium by simple distillation can be separated by fractional freezing. For example, the alloy is cooled to about −38° C. to freeze out rubidium in excess of that required for the formation of a CS-Rb eutectic mixture, which has a conjunction of 87% Cs and 13% Rb. The fluid eutectic is then filtered or otherwise separated from the solid pure rubidium.

According to the provision of the patent statutes, I have explained the principle and mode of practicing my invention and have described what I do now consider its best embodiment. However, I desire it to be understood that, within the scope of the appended claim, the invention may be practiced otherwise than as specifically described.

I claim:

A method of producing cesium which comprises the steps of reacting sodium and pollucite at a temperature between about 900° F. and 1300° F. and in the absence of atmosphere reactive with alkali metals, using at least about 5 moles of sodium for each molecular weight of cesium contained in said pollucite, said pollucite being in the form of lumps of at least about 3/8 inch size, and recovering by filtration the cesium produced thereby admixed with sodium.

References Cited

UNITED STATES PATENTS

| 2,054,316 | 9/1936 | Gilbert | 75—66 |
| 2,073,631 | 3/1937 | Gilbert | 75—66 |
| 2,424,512 | 7/1947 | Stauffer | 75—66 |

FOREIGN PATENTS 590,274   7/1947   Great Britain.

DAVID L. RECK, *Primary Examiner.*

RAY K. WINDHAM, WINSTON A. DOUGLAS, MARCUS U. LYONS, ROGER L. CAMPBELL, BENJAMIN HENKIN, HYLAND BIZOT, *Examiners.*

R. W. MacDONALD, H. W. CUMMINGS, H. W. TARRING, *Assistant Examiners.*